G. W. BULLEY.
CONTINUOUS VULCANIZING METHOD AND APPARATUS.
APPLICATION FILED APR. 26, 1918.
1,411,706.
Patented Apr. 4, 1922.
3 SHEETS—SHEET 3.
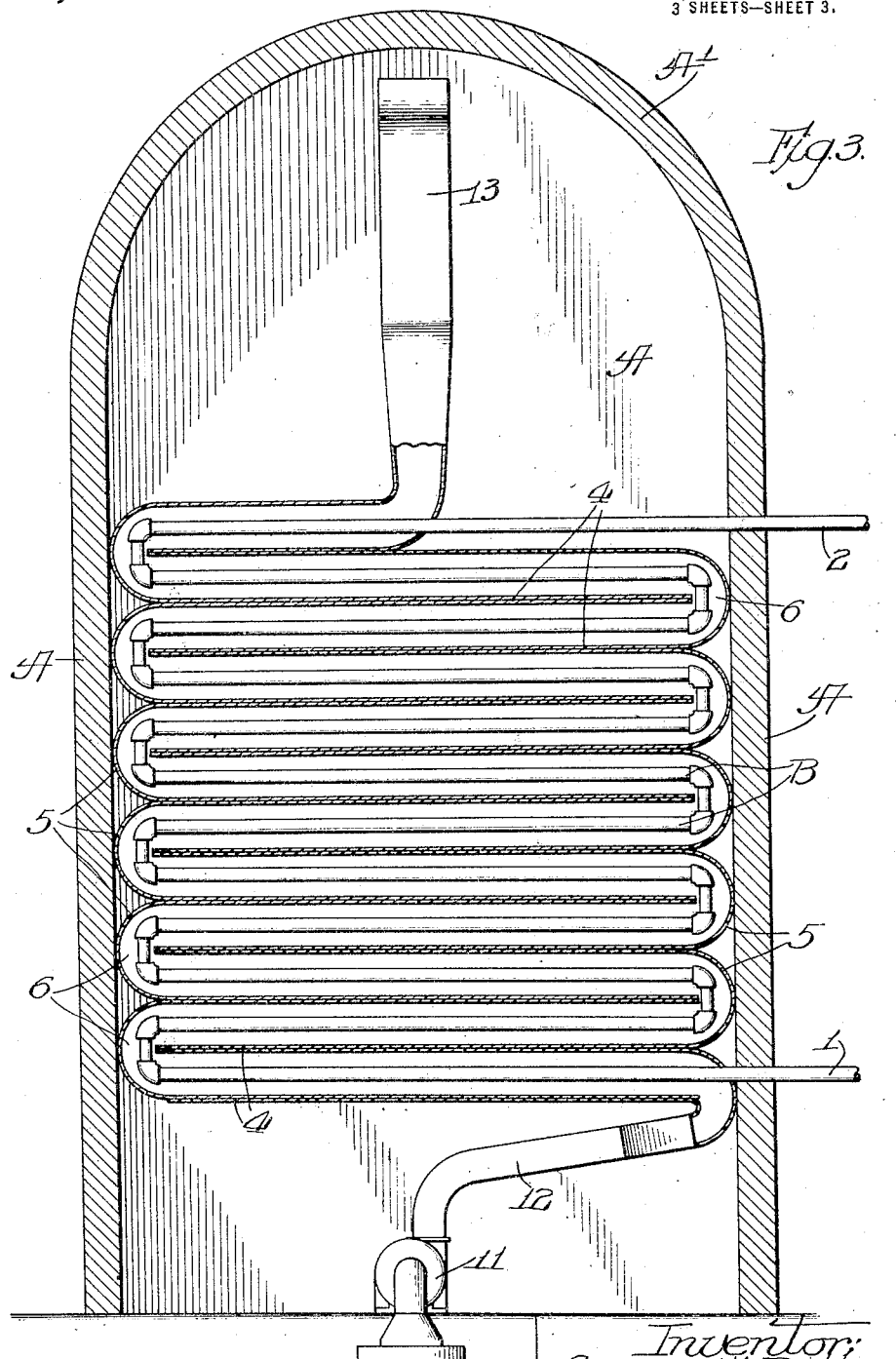

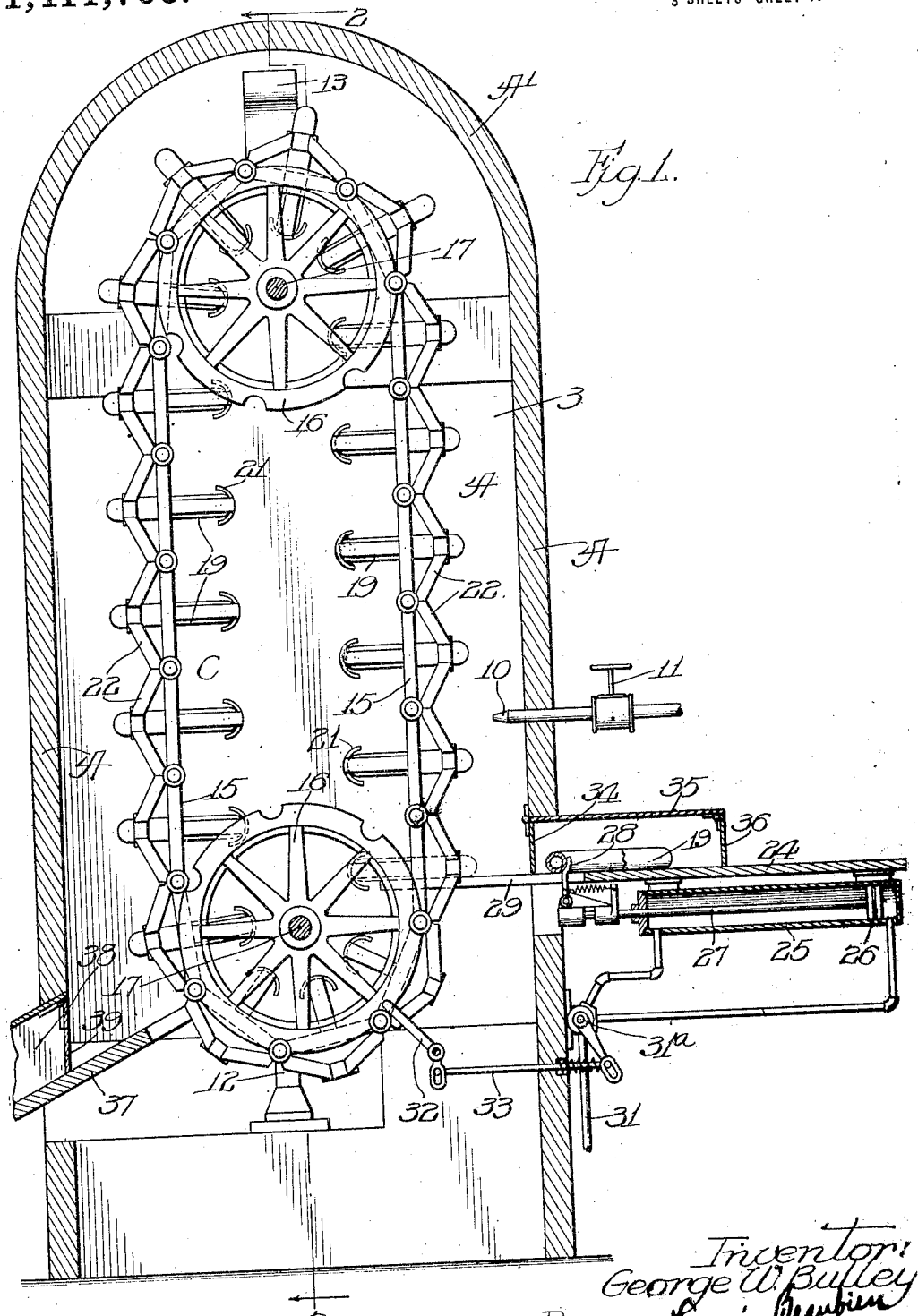

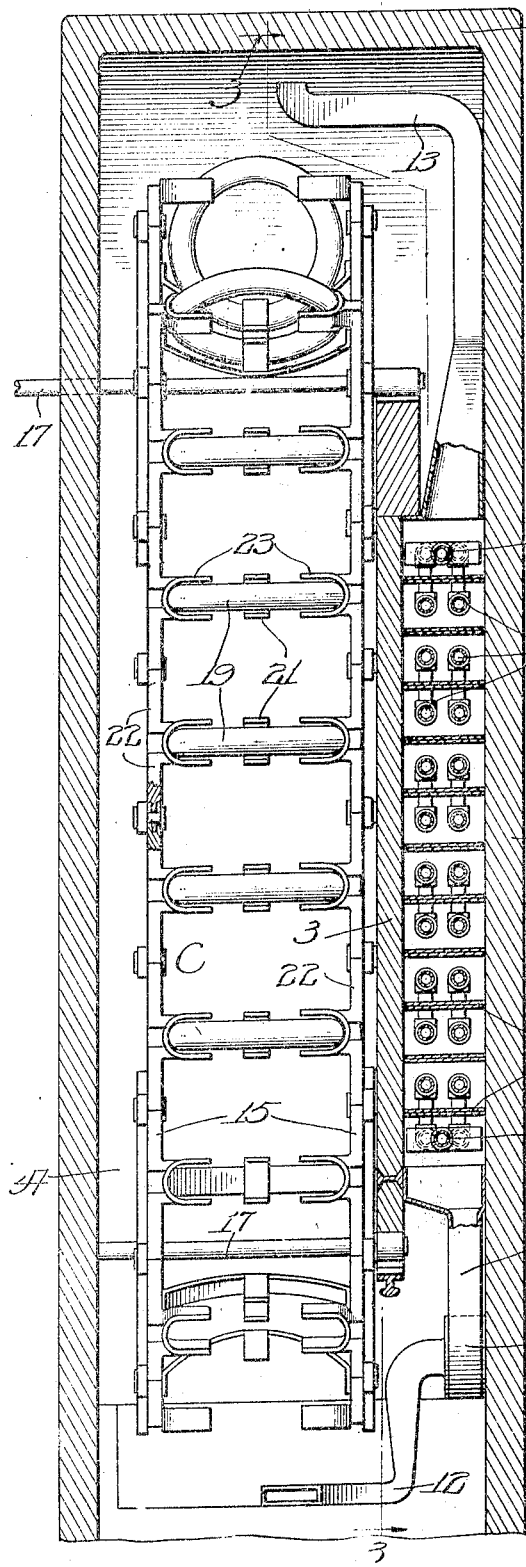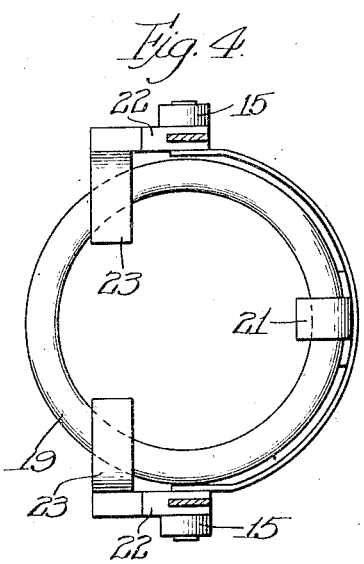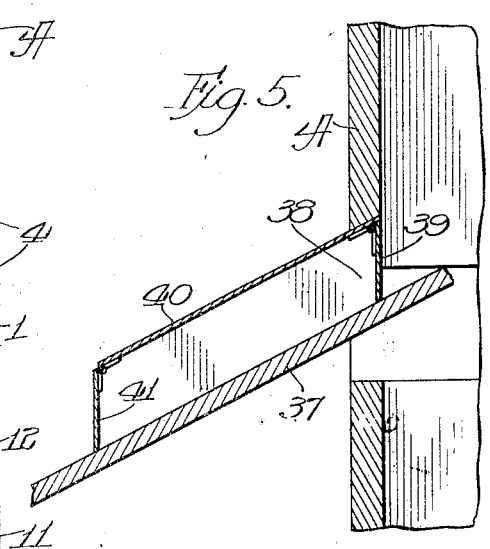

UNITED STATES PATENT OFFICE.

GEORGE W. BULLEY, OF ST. JOSEPH, MICHIGAN.

CONTINUOUS VULCANIZING METHOD AND APPARATUS.

1,411,706.

Specification of Letters Patent.  Patented Apr. 4, 1922.

Application filed April 26, 1918. Serial No. 231,032.

*To all whom it may concern:*

Be it known that I, GEORGE W. BULLEY, a citizen of the United States of America, and resident of St. Joseph, Berrien County, Michigan, have invented a certain new and useful Improvement in Continuous Vulcanizing Methods and Apparatus, of which the following is a specification.

My invention relates to the art of vulcanizing or curing rubber articles and has more particular reference to improvements in the method of and apparatus for vulcanizing automobile and other vehicle tires.

My object is to eliminate the difficulties and objections of the various methods of automobile tire vulcanization, and to substitute for the methods and apparatus generally employed, a method and apparatus by which a product of uniform and unvarying quality is obtained without waste, in greater quantity and at less cost and requiring less skill than has heretofore been possible.

As illustrative of the inefficiency of the usual methods of vulcanizing automobile tires, it is common practice to simply stack in a heating chamber a group or batch of tires enclosed in individual molds, and allow them to remain in said chamber in a quiescent condition until vulcanization is accomplished, whereupon they are removed to cool, and a fresh batch placed in the oven or chamber. It is obvious however that such a method as this, while satisfactory to a certain degree, is expensive and slow and the product is decidedly non-uniform. Because of the fact that the tires are thus handled in batches or groups the method is necessarily intermittent and irregular and considerable unprofitable time is consumed in placing the tires into and removing them from the heating oven, and in getting the oven ready for each heat. This procedure necessarily makes it practically impossible to maintain the temperature of the oven the same for the same length of time for each heat and the resulting product varies greatly in quality and degree of vulcanization. Another factor effects the product. Uncured rubber when heated, and until vulcanization sets in, has a decided tendency to soften and distort itself due to the influence of gravity and other forces, and since the tires are in an undisturbed position in the oven during the entire heating operation, the rubber will often flow to such an extent as to fatally affect the product. In fact it is generally accepted as not good practice to place tires upright while being heated because of this gravitational flow which causes structural distortion. For this reason the tires are generally positioned horizontally in the heating chamber to minimize this effect. Considering the objections further the heating ovens are productive of zones of varying temperature, and the molds are in contact with each other, and in consequence the lower tires in the stack are often undercured and the upper ones overcured.

In carrying out my invention I pass the tires preferably at a uniform rate of speed through a circulating heating medium maintained at constant temperature, the tires, and their molds, if they are enclosed in molds, being arranged or disposed one following the other in relatively close succession and out of contact with each other. To accomplish this I provide a mechanism which is continuous and automatic in operation and which subjects each succeeding tire to the same conditions and treatement.

Referring to the accompanying drawings;

Fig. 1 is a vertical sectioned view of a continuous vulcanizing mechanism embodying my invention.

Fig. 2 is a vertical sectional view of said mechanism on the line 2—2 of Fig. 1 at substantially right angles to the view in Fig. 1.

Fig. 3 is a vertical sectional view on the line 3—3 of Fig. 1.

Fig. 4 is an enlarged detail of one of the tire holders of the conveyor, and

Fig. 5 is an enlarged detail sectional view of the discharge door mechanism.

The structure which is shown in the drawings involves an oven or heating chamber A preferably completely closed and disposed vertically to minimize the floor space required. This chamber is rectangular in horizontal section. The walls are composed of brick and concrete and suitable insulation to prevent dissipation of the heat and at the same time provide a substantial structure. The roof or top wall $A^1$ is arched, or curved so as to serve as a deflector or baffle for the current of circulating heating medium within the chamber. The chamber contains a series of steam piping B for supplying the necessary vulcanizing temperature, and in the present structure this piping is positioned for convenience between one of the vertical side walls of the oven and the tire conveyor or carrier. The piping is connected at 1 and 2 with a suitable source of steam at the desired pressure for the purpose. The piping however is enclosed within a series of ducts through which the heating medium is circulated in contact with the heated pipes. These ducts are formed by a vertical partition wall 3 and a series of horizontal partitions 4. The vertical wall terminates short of the top and bottom of the structure and is spaced from the side wall. The horizontal partitions extend between the vertical partition and their opposite ends 5 are curved to provide passages 6 connecting the ends of the ducts, thus forming one continuous duct or passage of great length. The heating pipes are positioned within these ducts and provide an extensive heating area for the purpose. In the present case the heat is transmitted to the tires and molds through a medium of water vapor or saturated air which is introduced to the interior of the chamber by the valve controlled nozzle 10. This nozzle is connected with a source of saturated steam. In the preparation of the structure initially for operation the water vapor or steam is introduced into the chamber until the air is either replaced by the steam or saturated with moisture to the desired degree of humidity, the air gradually leaving the chamber through the doors through which the tires are introduced and discharged. I have found in practice that heated water vapor or saturated air operates as a very effective heat conductor, carrying the heat to the tires in less time than dry air and eliminating the dangers of oxidization of the rubber when dry air is employed. In order to prevent the existence of zones of varying temperature and to maintain a substantially constant temperature within the chamber I circulate the heating medium. For this purpose I provide a fan or blower 11 which may be of any standard or approved design. This blower is preferably driven by an electric motor and is positioned in the lower part of the chamber. The outlet of the fan is connected by means of a duct 12 with the lower end of the heating duct whereby the heating medium will be forced upwardly through the heating ducts. The heated water vapor is conveyed from the upper end of the heating duct by an extension duct 13 the end of which is positioned adjacent the arched roof of the chamber. The water vapor is discharged against this arched roof and deflected downwardly into the chamber. The intake of the blower is open to the lower end of the chamber from which the water vapor is withdrawn and forced through the heating ducts to the upper end. Thus a constant circulation of heated water vapor is maintained throughout the chamber whereby the entire interior of the chamber constitutes a zone of constant temperature and the tires are individually subject to the identical conditions. It will be further observed that the loss of heat is reduced to a minimum since the chamber is closed and the same heated medium is circulated therein.

An endless conveyor C for the tires is disposed vertically and centrally within the heating chamber and is arranged to travel constantly in one direction. This particular structure consists of two parallel endless chains 15 traveling around suitable sprocket wheels 16 at the upper and lower ends of the conveyor, the sprockets being on shafts 17 mounted in suitable bearings. In this case the upper shaft extends through the wall for connection with a suitable driving means. These chains have holders or brackets fastened thereto at regular intervals for the purpose of holding the tires. The tires and their molds are represented in the drawings by the annular or ring-shaped members 19, and the holders or brackets are constructed to handle these members. These holders are curved to conform to the tires, and comprise straps having at their centers the curved clips 21 arranged to embrace the members 19 and support them at one point. Outstanding from each chain are triangular bracket arms 22 each of which have similar clips 23 midway of their length which provide supports for the tires at two more points, these parts being proportioned so that the clips are positioned beyond the center of the largest annular members which the structure will be called upon to handle, hence the tire molds will be firmly held in position while being carried by the conveyor but free for removal or insertion with respect to the conveyor. The bracket arms are of the same length as the links of the conveyor chains and their ends are connected to the conveyor at the pivotal joints thereby maintaining the plane in which the tires lie substantially radial to the sprocket wheel centers when traveling around said sprocket. The tires are, in the present structure fed successively to the conveyor in a horizontal position at the lower end of the conveyor on the "up" side thereof. They are carried upwardly by the conveyor until they reach the top thereof, and in passing around the upper end thereof they are completely turned over and carried downward in reversed position, to the lower end of the conveyor where they are successively discharged. Thus during the progress of vulcanization and while they are in motion in the heating oven the position or relation of the tires is altered or changed with respect to the action of gravity:—that is the position of the material in the tires is altered or changed relatively to the constant downwardly acting force of gravity thereon with the result that the effect of gravity on the material is neutralized because the flow of material does not persist long enough in one direction relatively to the tire to cause a permanent distortion of the material. The feeding of the tires to the conveyor may of course be accomplished manually but I prefer that it shall be done continuously and mechanically by a suitable feeder because the latter method operates with more precision and makes possible the use of unskilled labor and consequent reduction in the cost of production. In any event I move or pass the molds and tires successively through the heating zone, and each individual mold is maintained completely separate and out of contact not only with each other mold but also out of contact with all metal or other parts of the mechanism except the comparatively small points of support of the holders. Thus each unit mold is heated entirely independent and individually. That they are all heated alike however is evident because they traverse the same path in the heater, the consequence being that the resulting product is remarkably uniform.

I provide a horizontal platform or guide way 24 which extends into the heating chamber to a point close to the conveyor. This platform extends through an opening in the wall of the structure wide enough to permit the passage of the molds therethrough. Beneath the platform is a compressed air feeder embodying a long cylinder 25 disposed horizontally and having a piston 26 and a piston rod 27 operating towards and from the conveyor. The piston has at its outer end a trigger 28 which projects above the guide way through a long slot 29 therein. This trigger engages the inner periphery of the tire mold and when steam or compressed air is admitted back of the piston it carries the mold along the guide way and enters or inserts it into the holders of the conveyor. The piston then returns to normal and carries the finger or trigger to engage the next mold. In order to allow the trigger to pass to the inner periphery of the next mold on its return stroke it is hinged on the end of the piston rod and is yieldingly held in a vertical position by a spring. On the forward stroke the trigger is rigid vertical so as to carry the mold with it. The feeding of the tires to the conveyor by this mechanism is timed so that as each holder arrives in position a tire is inserted in to it. This is preferably accomplished by a controller which governs the supply of the air to the cylinder. In the air supply pipe 31 for the cylinder a valve 31ª is provided which controls the air to the cylinder. This valve is operated by a control lever 32 through a rod 33. The lever is pivotally mounted in a suitable support and its end lies in the path of the holder clips at one side of the conveyor. As the holder clips reach a position to receive a mold, the valve will be automatically operated and air supplied to operate the feeding mechanism. The feeding opening in the wall on the oven is covered by a hinged or swinging door 34 pushed open by each mold or tire as it enters the chamber and then swings closed after the tires have passed, this being provided to conserve the heat in the chamber and prevent the entrance of cold air draughts. As a further precaution, however, I provide an enclosure 35 which covers the opening and provides an auxiliary chamber in which the tires are positioned for the feeding mechanism. This auxiliary chamber is preferably of just sufficient size to accommodate one mold or tire. The mouth of this chamber is also covered by a swinging door 36 acting in the same manner as the inner door. It will thus be observed that the outer door 36 is spaced from the inner door so that it will close before the inner door is opened, hence cold air draughts cannot enter the heating oven. The operator places the mold or tires in the auxiliary chamber as fast as they are carried therefrom to the conveyor, this preliminary operation being accomplished manually or automatically as desired. The tires are discharged from the lower end of the conveyor on the "down" side and as the tires successively arrive at the lower end thereof they drop by gravity from the holders when a sufficient angle is reached in passing around the lower sprocket wheels. The mold or tires drop onto an inclined guide way or chute 37 which delivers them through an opening 38 in the chamber wall to a position where they may be removed as desired. This opening is likewise protected against draughts and cold air by a swinging door 39 and an auxiliary chamber or enclosure 40 which forms a delivery chamber. This compartment also has an outer swinging door 41, the two doors being spaced apart to permit the closure of the inner door prior to the opening of the outer one.

I claim:

1. The herein described method of vulcanizing vehicle tires consisting in moving the tires individually in close succession through a chamber at predetermined speed causing gravity to control the flow of the rubber in the tires by changing the position of the tires relatively to the action of force of gravity, and circulating heated water vapor in said chamber.

2. In a continuous vulcanizing mechanism the combination of an enclosure forming an upright heating oven, means for introducing water vapor into said oven, heating means for said water vapor, means for circulating the heated vapor within said oven, and a constantly moving conveyor in said oven for carrying the articles to be vulcanized.

3. In a continuous vulcanizing mechanism the combination of an enclosure forming a heating oven, means for introducing water vapor into said oven, heating means for said water vapor, means for circulating the heated vapor within said oven, and a continuous tire carrier for moving the tires in the zone of said circulating heated vapor.

4. In a continuous vulcanizer, the combination of heating oven, means for circulating water vapor therein, a constantly operating tire carrier for carrying the tires in succession in the zone of said circulating vapor, and means for feeding the tires successively to said carrier.

5. A continuous vulcanizer comprising in combination an enclosure forming an oven chamber, means for introducing water vapor to said chamber to provide a heat transferring medium in said chamber, ducts communicating with the interior of said chamber for the passage of said vapor, heating means in said ducts for heating the vapor, means for maintaining the heated vapor in circulation through said ducts and chamber, and a traveling tire-carrying mechanism for moving the tires in the zone of said circulating medium.

6. A continuous vulcanizer comprising in combination an enclosure forming an oven chamber, means for introducing water vapor to said chamber to provide a heat transferring medium in said chamber, ducts communicating with the interior of said chamber for the passage of said vapor, heating means in said ducts for heating the vapor, means for maintaining the heated vapor in circulation through said ducts and chamber, a tire-carrying conveyor for maintaining the tires in motion in the zone of said circulating medium, and an automatic feeder for periodically feeding the tires to said conveyor.

Signed by me at Chicago, Ill., this 21 day of January 1918.

GEORGE W. BULLEY.